United States Patent [19]

Warren et al.

[11] 4,179,784
[45] Dec. 25, 1979

[54] TOOL FOR INSTALLING VEHICULAR COIL SPRINGS

[76] Inventors: Florien J. Warren, c/o George Spector, 3615 Woolworth Bldg., 233 Broadway; George Spector, 3615 Woolworth Bldg. 233 Broadway, both of New York, N.Y. 10007

[21] Appl. No.: 762,316

[22] Filed: Jan. 25, 1977

[51] Int. Cl.² .............................................. B23Q 3/00
[52] U.S. Cl. .................................. 29/283; 24/243 B; 24/279; 267/61 S
[58] Field of Search ................. 267/60, 61 R, 61 S, 267/135, 166, 169; 29/215–221, 225–227, 283; 254/10.5; 24/243 R, 243 B, 257, 279

[56] References Cited

U.S. PATENT DOCUMENTS

| 829,393 | 8/1906 | Finkenbinder | 24/279 X |
|---|---|---|---|
| 1,114,601 | 10/1914 | Gerderes | 29/217 |
| 1,382,840 | 6/1921 | Levedahl | 24/279 X |
| 1,416,012 | 5/1922 | Gentile | 24/279 |
| 1,466,796 | 9/1923 | Kibbe | 29/227 X |
| 1,988,295 | 1/1935 | Berry | 267/135 X |
| 2,370,111 | 2/1945 | Stoudt | 267/135 |
| 2,707,034 | 4/1955 | Hetrick | 24/257 R X |
| 3,883,116 | 5/1975 | Buccino | 254/10.5 |

FOREIGN PATENT DOCUMENTS 910015  11/1962  United Kingdom .................... 29/227

Primary Examiner—Johnny D. Cherry

[57] ABSTRACT

An automobile mechanic's tool for use to install an oil coil spring more easily by maintaining it in a compressed condition, without the middle of the spring bulging sidewardly while opposite ends are being seated; the tool consisting of several linear flat steel plates secured to a flexible spring metal band so to wrap around the coil spring in order to form a sleeve in which the coil spring is confined; the opposite ends of the band being easily connectable together so to maintain the sleeve shape during the installation.

2 Claims, 4 Drawing Figures

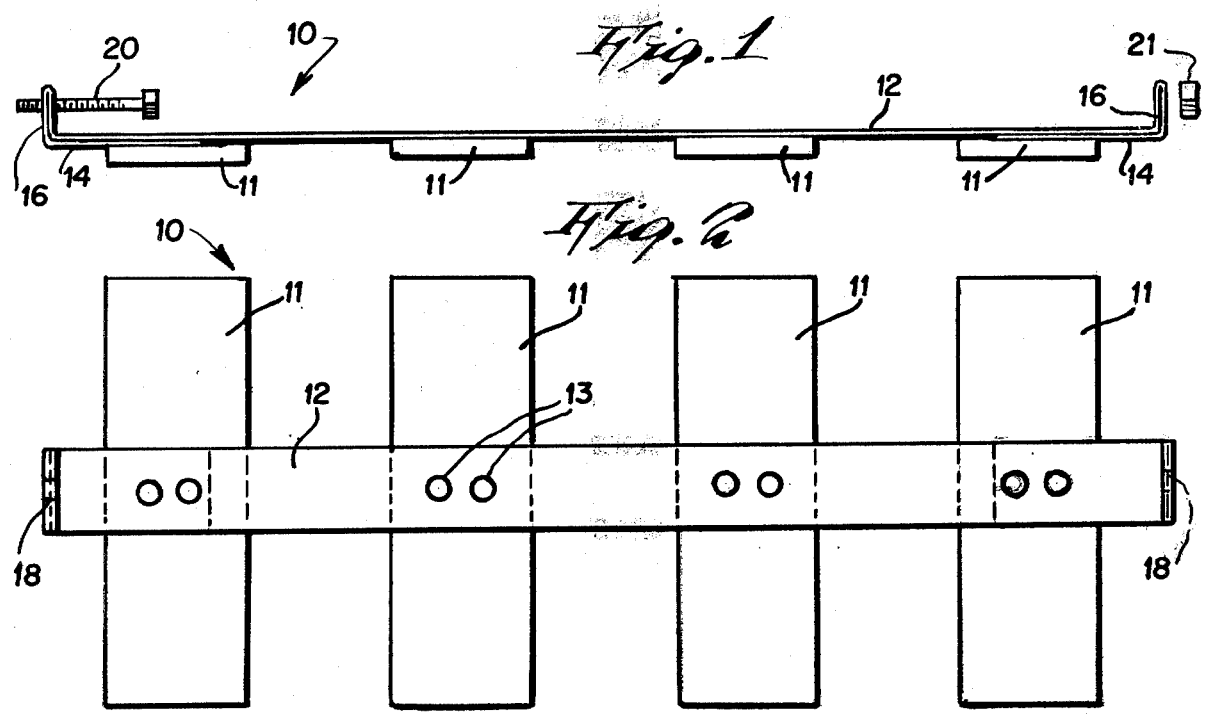
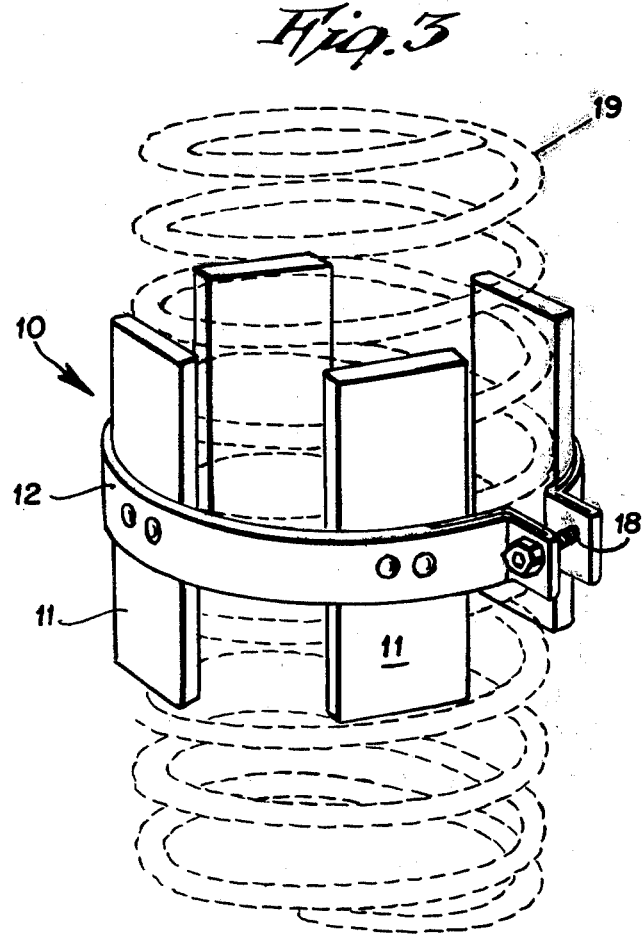
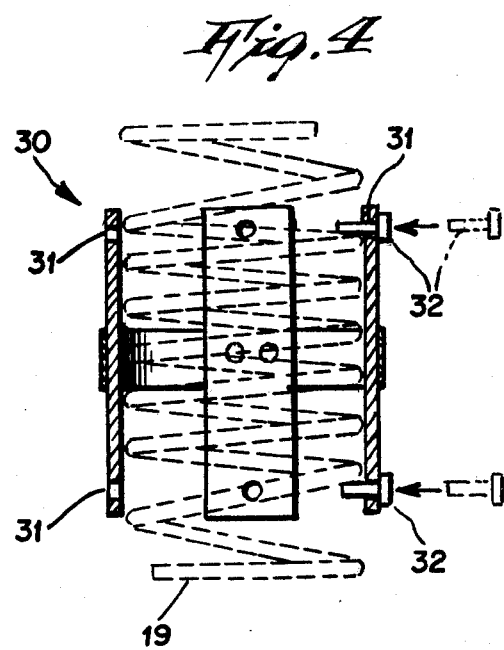

TOOL FOR INSTALLING VEHICULAR COIL SPRINGS

This invention relates generally to tools for automobile service station mechanics. More specifically it relates to a tool for installing a compression coil spring, such as an oil spring.

It is generally well known to automobile mechanics that it is difficult to install an oil spring replacement. When this compression coil spring is squeezed together so to seat the opposite ends thereof, the middle of the spring tends to bulge sidewardly so to suddenly fly outward. This is dangerous as it can strike the mechanic in the face doing serious harm to him. This situation is accordingly in want of an improvement.

Therefore it is a principal object of the invention to provide a tool for making the installation of a compression coil spring a safe, quick, and trouble-free operation.

Another object is to provide a tool that can be made in different sizes so to be adaptable for the installation of any compression coil spring that must be seated at its opposite ends, such as oil springs, a spring located between a vehicle body and a chassis, or the like.

Other objects are to provide a tool which is simple in design, inexpensive to manufacture, rugged in construction, easy to use and efficient in operation.

These and other objects will be readily evident upon a study of the following specification and the accompanying drawing wherein:

FIG. 1 is a top edge view of the invention.

FIG. 2 is a front view thereof.

FIG. 3 shows it installed around a compression coil spring.

FIG. 4 is a side cross sectional view of a modified design of the invention shown installed around a spring, and illustrating its ability to additionally hold the spring in a compressed condition.

Referring now to the drawing in greater detail, and more particularly to FIGS. 1 to 3 at the present time, the reference numeral 10 represents a tool according to the present invention wherein there are four flat steel plates 11 of linear shape, and which are permanently secured to a flexible spring metal band 12 by means of rivets 13. The plates are located equidistant apart and parallel to each other; the longitudinal axis of each plate being at right angle to a longitudinal axis of the band. While the band is shown across a center of the plates, it could be made to go across the plates closer to one end thereof for certain advantages in use of the tool, if preferred.

Each opposite end 14 of the band extends beyond the endmost plate, and is bent over to be double thickness as shown in FIG. 1 adjacent numerals 14. A terminal extending portion thus formed is then bent over at right angle, so to form a tab 16 at each end. Each tab has a central opening 18 therethrough that align with each other to receive a bolt 20 engageable by a nut 21.

The length of the band is such so that it fits around the spring snuggly, so that in operative use when opposite ends of the spring are tried to be seated, the middle of the spring is prevented by the tool to bulge sidewardly.

Referring now to FIG. 4, a modified design of the tool 30 is shown that is the same as above-described tool 10 except that it additionally includes an opening 31 near each opposite end of each plate 11 so to removably receive a pin 32. The purpose of this is so to hold the spring in a compressed condition between the pins while the spring is being seated so that it is still easier work for the mechanic to bring the spring into position for installation, after which he simply pulls out the pins causing the spring ends to snap into the seats, and after which he then removes the nut 21 to disconnect the opposite ends of the band so to remove the tool.

Thus a modified design is provided.

While various changes may be made in the detail construction it is understood that such changes will be within the spirit and scope of the present invention as is defined by the appended claims.

We claim:

1. A tool for reinforcing compression coil springs during installation between opposite seats, the combination of a plurality of parallel spaced longitudinal plates, and a transverse flexible metal band having an inner surface, said plates being rigidly affixed at right angles to said inner surface of said band whereby said band fully circumscribes said plates when bent into curvate form including integral opposite ends of said bands extending outwardly at right angles to said band forming opposing spaced tabs, aligned openings through said tabs, a bolt adapted to fit through said openings when said tool is mounted around a compression coil spring periphery, said bolt including a nut mounted on said bolt engaging a tab thereby retaining the band in a curvate position with said plates engaging compressively said spring, thus preventing bulging of said spring.

2. The combination as set forth in claim 1, wherein spaced holes are provided near opposite ends of each said plate including removable pins mounted therein, said holes being so spaced whereby said pins engage spaced spring coils to retain said coils in compressed condition prior to seating said spring.

* * * * *